US006866109B2

(12) United States Patent
Roach

(10) Patent No.: US 6,866,109 B2
(45) Date of Patent: Mar. 15, 2005

(54) MOBILITY VEHICLE

(76) Inventor: Thomas Roach, 30 Harbor View, Lake St. Louis, MO (US) 63367

( * ) Notice: Subject to any disclaimer, the term of this patent is extended or adjusted under 35 U.S.C. 154(b) by 12 days.

(21) Appl. No.: 10/218,264

(22) Filed: Aug. 14, 2002

(65) Prior Publication Data

US 2004/0031630 A1 Feb. 19, 2004

(51) Int. Cl.[7] ................................................ B60K 1/00
(52) U.S. Cl. ...................... 180/65.1; 180/216; 180/208; 280/87.041
(58) Field of Search ............................. 180/65.1, 65.5, 180/65.8, 65.3, 65.6, 181, 208, 216, 220, 221, 224, 271, 311, 907; 280/87.041, 87.042, 87.043; 477/188, 203, 21, 29

(56) References Cited

U.S. PATENT DOCUMENTS

| | | | |
|---|---|---|---|
| 3,710,883 A | | 1/1973 | Rizzo |
| 4,538,695 A | | 9/1985 | Bradt |
| 4,570,739 A | * | 2/1986 | Kramer ...................... 180/216 |
| 4,947,955 A | * | 8/1990 | Hopely, Jr. ................. 180/216 |
| 5,139,121 A | * | 8/1992 | Kumura et al. ............ 180/65.1 |
| 5,228,533 A | * | 7/1993 | Mitchell ..................... 180/208 |
| 5,511,809 A | | 4/1996 | Sagi |
| 5,562,300 A | | 10/1996 | Nelson |
| 5,697,465 A | | 12/1997 | Kruse |
| 5,894,898 A | * | 4/1999 | Catto ........................ 180/216 |
| 5,921,338 A | * | 7/1999 | Edmondson ................ 180/65.5 |
| 5,941,327 A | * | 8/1999 | Wu ............................ 180/65.1 |
| 6,170,592 B1 | * | 1/2001 | Wu ............................ 180/208 |
| 6,227,324 B1 | * | 5/2001 | Sauve ........................ 180/228 |
| 6,267,190 B1 | * | 7/2001 | Micheletti .................. 180/216 |
| 6,291,953 B1 | * | 9/2001 | Lovatt et al. .............. 180/65.1 |
| 6,336,517 B1 | * | 1/2002 | Cheng ........................ 180/208 |
| 6,439,331 B1 | * | 8/2002 | Fan ............................ 180/208 |
| 6,491,122 B2 | * | 12/2002 | Leitner et al. ............. 180/65.8 |
| 6,505,845 B1 | * | 1/2003 | Fong ....................... 280/87.041 |
| 6,609,596 B1 | * | 8/2003 | Lin ............................ 180/271 |
| 6,619,416 B2 | * | 9/2003 | Lan ............................ 180/181 |
| 6,619,679 B2 | * | 9/2003 | Lan ............................ 180/181 |
| 6,655,717 B1 | * | 12/2003 | Wang ........................ 180/65.1 |

* cited by examiner

*Primary Examiner*—Hau Phan
(74) *Attorney, Agent, or Firm*—Polster, Lieder, Woodruff & Lucchesi, L.C.

(57) ABSTRACT

A mobility vehicle (10) is formed by attaching a pair of scooter (S) bases (16) to a platform (14). Each scooter base includes two wheels (18, 20) and one of the wheels is drivingly connected to a battery (14) operated motor (12) to drive the vehicle. The battery and motor both comprise part of a scooter. A yoke (70) extends between the scooter wheels (18) at the front of the vehicle and a steering column (23) attaches to the yoke for steering for the vehicle as the column is turned. The steering column includes handlebars (24a, 24b) with associated handgrips (25a, 25b) for controlling vehicle speed and braking the vehicle to stop it. A seat (44) mounts on the platform for the operator of the vehicle to sit down while driving it. The seat and steering column are both removable for storing the vehicle.

12 Claims, 4 Drawing Sheets

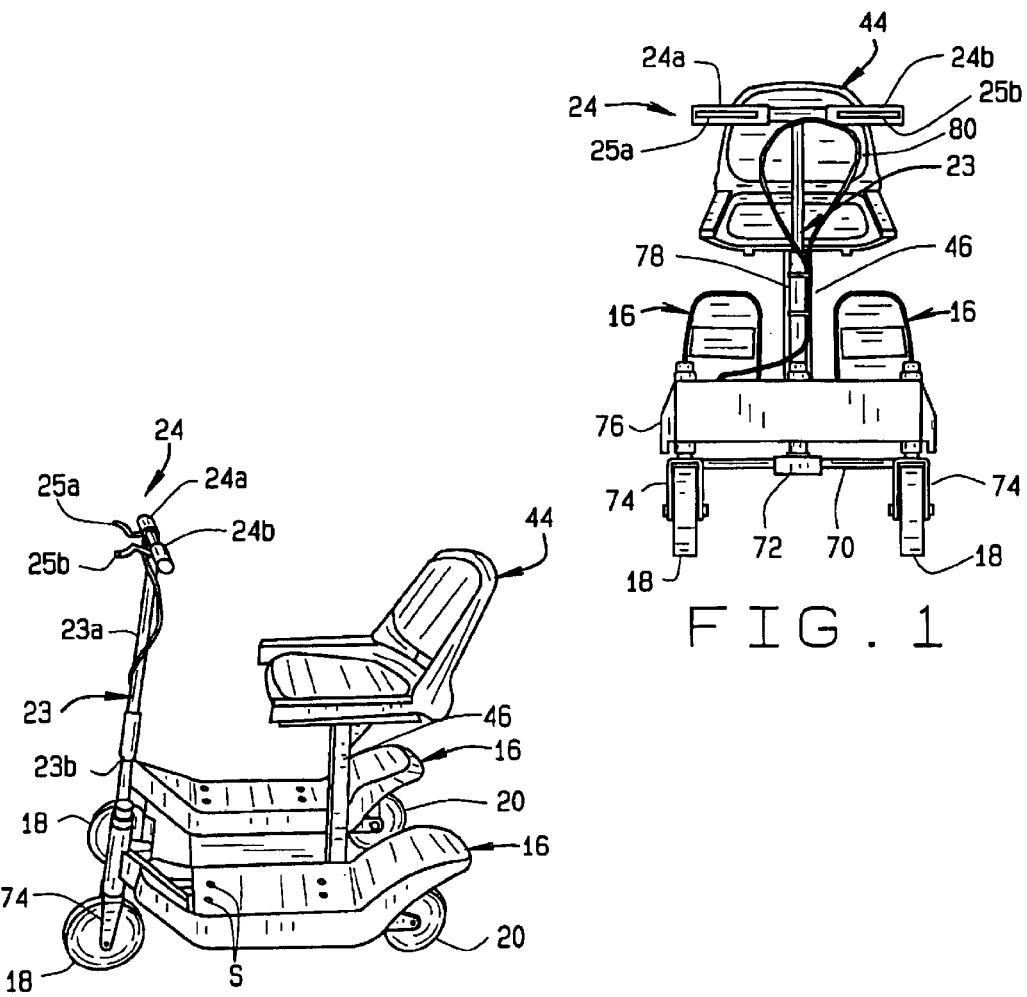
FIG. 1
FIG. 2
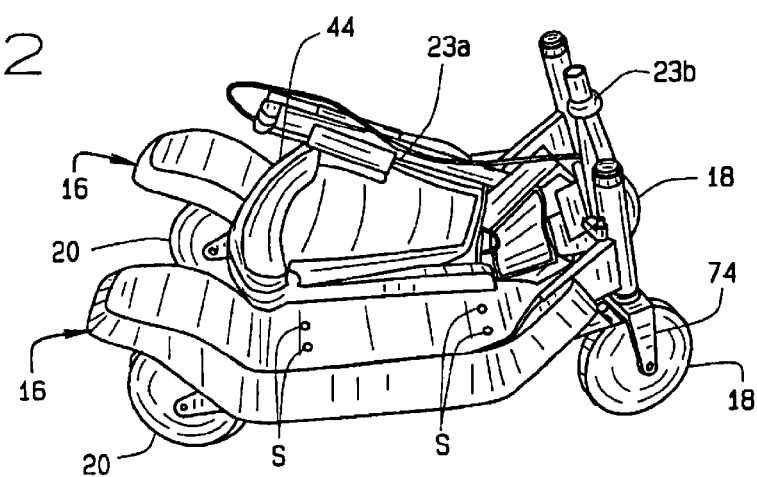
FIG. 3

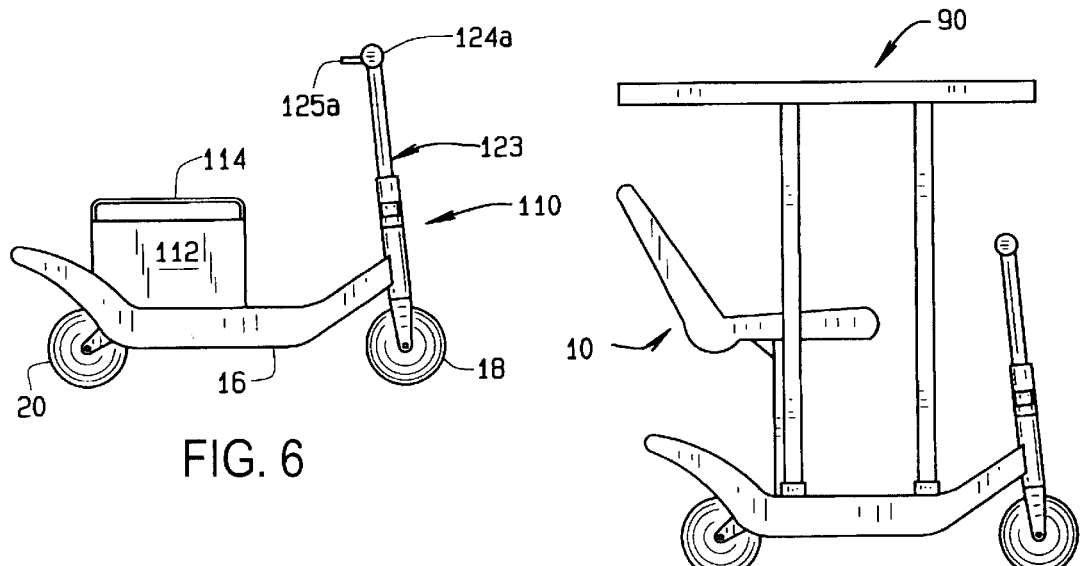
FIG. 6
FIG. 9
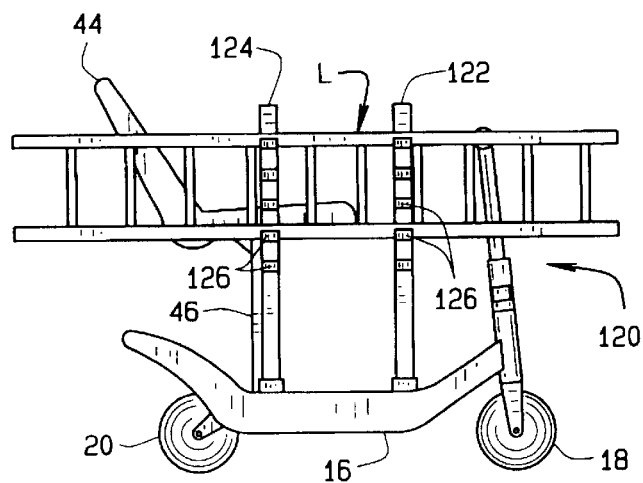
FIG. 7
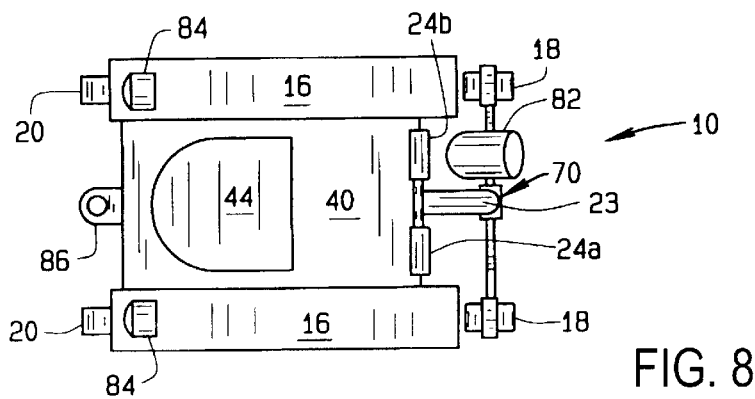
FIG. 8

MOBILITY VEHICLE

CROSS REFERENCE TO RELATED APPLICATIONS

None

STATEMENT REGARDING FEDERALLY SPONSORED RESEARCH OR DEVELOPMENT

Not applicable

BACKGROUND OF THE INVENTION

This invention relates to self-powered, low-speed vehicles such as utility vehicles used in a variety of applications, and more particularly to such a mobility vehicle formed by connecting together two scooters.

Various types of self-powered vehicles are known in the art. These are typically battery or gasoline powered vehicles such as golf carts and the like which operate at relatively low speeds and carry one or two persons. Some utility vehicles are equipped to transport tools, etc. about a factory, warehouse, or work site. Typical utility vehicles operate at speeds of 10–12 miles per hour and cost $2,500 and up depending upon the features with which they are equipped. Even at the low speeds these vehicles operate, they can still travel fast enough that if they are involved in an accident, the occupant can be severely injured and a substantial amount of damage caused.

Another problem with such vehicles is that, small as they are, they are still too large from many applications. For example, occupants of mobile homes often need auxiliary transportation about the site where the home is parked. Usually, the occupants cannot afford to tow an automobile, and golf carts or similar vehicles are not only too large to conveniently tow, but are also too big to be stowed in the mobile home. Even if transportable, they generally are not readily connected to a battery charger so they can be ready for use when needed.

Battery powered scooters are known in the art. A conventional powered scooter has two wheels, one affixed to each end of a support base on which the user stands. Rechargeable DC batteries are used to power a DC motor which drives the scooter using a belt or chain and sprocket drive. A column extending upwardly from the front end of the scooter includes a pair of handle bars, one of which is used to control the speed of the scooter, and the other to brake the scooter. The scooter operates at speeds substantially lower than those of golf carts and similar types of commercial utility vehicles. While popular among teenagers and young adults, the scooter is not easy for older adults to use because the elderly do not have the acute reflexes and sense of balance younger people have. Also, conventional scooters do not have provisions for carrying things unless the user carries them on his body in a backpack or the like.

Nonetheless, power scooters have certain advantages over utility vehicles. For one thing, they are inexpensive costing only in the hundreds rather than thousands of dollars. Their size makes them easy to store. And, because they have a maximum speed of well under 10 miles per hour, they are safer to use and present less chance of serious injury or property damage in the event of an accident.

BRIEF SUMMARY OF THE INVENTION

The present invention, briefly stated, comprises a mobility vehicle fabricated using a pair of scooters. The scooters are attached to a base plate so the two-wheel vehicles are converted to a four-wheeled vehicle. Rechargeable DC batteries and a motor used to power the scooter are used to power the resulting vehicle. The maximum operating speed of the vehicle is relatively slow making it suitable for use by older or infirm people, in factory or warehouse settings where speed is not a requirement, on nature trails and like, or as an auxiliary mode of transportation for people with mobile homes who need a convenient rather than rapid form of transit.

The steering column and handle bars from one of the scooters is connected to a yoke extending between the scooters so the occupant can steer the vehicle. While the user could operate the vehicle standing, a detachable seat is provided. The steering column is also detachable so the vehicle can be conveniently stored when not in use.

Various attachments or fixtures can be added to the vehicle for storage of various items or the transport of tools. The vehicle is compact in size, light in weight, can operate for up to two (2) hours on a battery charge, and the batteries quickly recharge when connected to a charger. Finally, the vehicle is substantially lower in cost than current battery or gasoline powered utility purposes available for the same purposes.

Other objects and features will be in part apparent and in part pointed out hereinafter.

BRIEF DESCRIPTION OF THE SEVERAL VIEWS OF THE DRAWINGS

The objects of the invention are achieved as set forth in the illustrative embodiments shown in the drawings which form a part of the specification.

FIG. 1 is a front elevation view of the mobility vehicle of the present invention;

FIG. 2 is a side view of the vehicle;

FIG. 3 is a perspective view of the vehicle with the seat removed and steering column folded for storing the vehicle;

FIG. 6 is a side view of a second embodiment of the vehicle including a storage box;

FIG. 7 is a side view of a third embodiment of the vehicle including a detachable frame for transporting ladders and the like;

FIG. 8 is a front view of a fourth embodiment of the vehicle including front and rear lights; and, FIG. 9 illustrates the mobility vehicle with a roof to protect the user from the elements.

Corresponding reference characters indicate corresponding parts throughout the several views of the drawings.

DETAILED DESCRIPTION OF INVENTION

Figure 4:
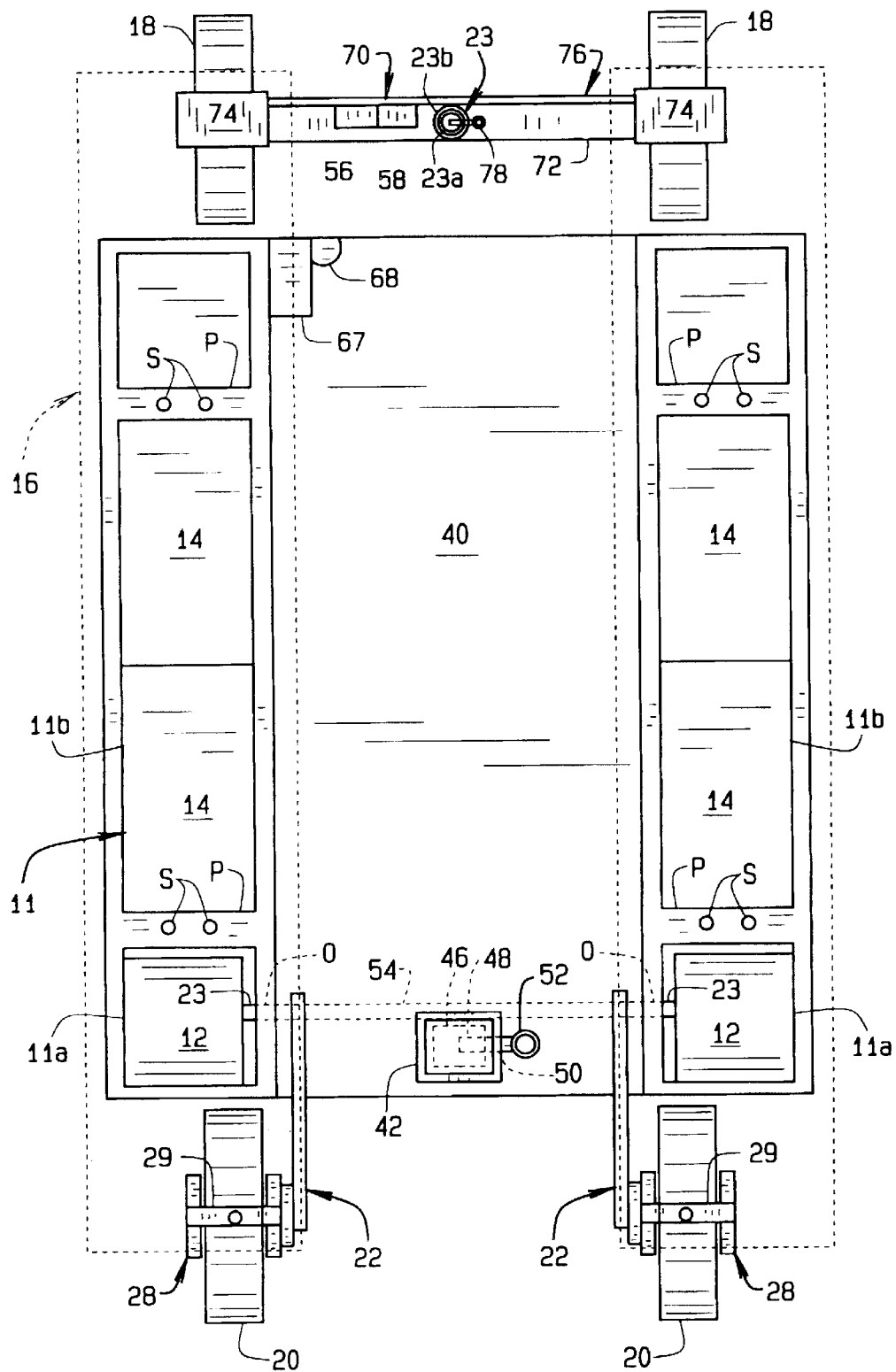
FIG. 4 is a top plan view of a platform to which two scooter bases are attached for constructing the vehicle.

The following detailed description illustrates the invention by way of example and not by way of limitation. This description will clearly enable one skilled in the art to make and use the invention, and describes several embodiments, adaptations, variations, alternatives and uses of the invention, including what I presently believe is the best mode of carrying out the invention. As various changes could be made in the above constructions without departing from the scope of the invention, it is intended that all matter contained in the above description or shown in the accompanying drawings shall be interpreted as illustrative and not in a limiting sense.

Referring to the drawings, a mobility vehicle of the present invention is indicated generally 10. The vehicle is used for carrying a person from one place to another; and in some embodiments, facilitates the hauling of tools, ladders, and other items. For carrying individuals, the vehicle, which is collapsible for easy storage, provides low cost transportation. As such, it is useful for people having large recreational vehicles or mobile homes who need local transportation when they stop, but do not want, need, or have room for, a regular automobile, golf cart, or similar type transport. In factory, warehouse, job site and farm settings, vehicle 10, which has a carrying capacity of up to 900 lbs., allows the user to efficiently and safely transport tools, equipment, feed, maintenance items, etc. The vehicle has a top operating speed of under 10 mph so as to not present a safety hazard to the driver or others. With a rechargeable battery life of up to 8 hrs., the vehicle is suited for shift operations in manufacturing and work site environments.

Vehicle 10 is constructed from a pair of powered scooters (not shown), each of has an undercarriage 11. Mounted on, or to, the undercarriage is a reversible DC motor 12 and at least one, and preferably, a pair of batteries 14 powering the motor. Motor 12 is installed in a compartment 11a formed at the rear of the carriage. The batteries are installed in a compartment 11b which is forward of compartment 11a. Each scooter further includes a base 16 on which a person operating the scooter stands. The base is mounted on top of carriage 11 using screws S inserted into screw holes in respective mounting plates P located at the front and rear of the carriage. Front and rear wheels 18, 20 are attached to respective ends of the scooter base. Rear wheel 20 is drivingly connected to motor 12 using, for example, a belt drive 22. The belt is attached to the outer end of a motor shaft 23 which projects through an opening O in the inner wall of the carriage. This allows the motor to drive the scooter. The forward and rear sections of the scooter base curve upwardly to provide clearance for the front and rear wheels of the scooter.

A steering column 23 extends upwardly from scooter base 16 at the front end of the base. The lower end of the steering column is connected to front wheel 18 to steer the scooter. A pair of handlebars 24 are attached to the steering column at the top of he column. Each handlebar includes a handgrip 25a, 25b respectively, by which the rider controls the speed of the scooter on which he is standing, or applies a brake to slow down or stop the scooter. One of the handlebars 24a is connected to a motor speed control circuit to control the speed of motor 12 and hence the speed of the scooter. The other handlebar 24b operates a brake mechanism 28 which is connected to the rear wheel of the scooter to brake the scooter. The brake mechanism includes brake pads mounted on a pivotal support 29 which is operated by handlebar 24b.

With conventional scooters, the person riding the scooter does so standing up with one foot placed in front of the other on base 16. The rider guides the scooter by angling his body in a direction he wishes to go and by turning front wheel 18 of the scooter using the handlebars. By changing the pressure on handgrip 25a of handlebar 24a, he can speed up or slow down the scooter. By pressing the handgrip 25b of handlebar 24b, he applies the brake to rear wheel 20 to stop the scooter.

In constructing vehicle 10 of the present invention, both scooters are broken down into their component parts. Both scooter bases 16 are now used in constructing the mobility vehicle. The wheels 18, 20 attached to the scooter base are also be used, as are the DC motors 12, batteries 14, rear wheel drive mechanisms 22, motor speed control circuits 26, and braking units 28. However, in some circumstances, it is desirable to replace one or both the wheels. For example, wheels having a wider tread may be substituted. In addition, only one steering column 23 and associated handlebars 24 and handgrips 25 are used. As described hereinafter, a steering mechanism allowing both sets of wheels to be simultaneously controlled using only the one column and associated attachments is now employed.

Vehicle 10 includes a platform 40 to which both the scooter bases 16 are attached. The platform comprises a flat, rectangular plate formed of metal or a high durability, high impact resistant plastic material. Scooter bases 16 are arrayed along opposite sides of the plate so to extend parallel to each other. The length of the scooter bases is greater than the length of plate 40, and the bases 16 are mounted to the plate so that their forward and rear ends overhang the ends of the plate. The carriages 11 to which the scooter bases are attached, are mounted to the top surface of platform 40, as shown in FIG. 4. The outer face of the carriages are aligned with the sides of the plate and the carriages are attached to the plate in a convenient manner. For example, the carriages can be bolted or welded to the plate.

A seat bracket 42 is attached to the top of plate 40 adjacent the rear edge of the plate. The bracket is generally square or rectangular in plan and extends a predetermined height above the upper surface of plate 40. A seat indicated generally 44 in the drawings is a commercially available seat. The seat may have a padded seat and back. The underside of the seat is mounted on the upper end of a post 46. The post is a rectangular post the lower end of which is sized to fit in bracket 42. The post and bracket have corresponding openings 48, 50. When the openings are aligned, a key 52 is inserted through both openings to lock the post in the bracket and mount the seat on the platform. When the key is removed, the seat can be removed for storage. This is as shown in FIG. 3.

The drive system for vehicle 10 utilizes both the DC motor 12 and batteries 14 from both of the scooters. Each battery is connected to a rear wheel 20 of the vehicle using the belt drive system 22 extending between the motor and its associated wheel. It will be appreciated by those skilled in the art that vehicle 10 will effectively operate even if only one of the motors 12 and its associated batteries are used. In this configuration, a motor shaft extension 54 (the dashed line extension shown in FIG. 4) extends from the one side of the platform where the motor is installed, across the platform, and is rotatably mounted to the inside wall of the other carriage 11. The belt drive 22 for the other wheel is then mounted on the extension, so rotation of the one motor turns both wheels. In this configuration, the maximum speed of the vehicle will be about the same as if both motors were used, but if the vehicle is consistently operated at this speed, the operating time of the batteries before they need to be recharged is reduced.

Figure 5:
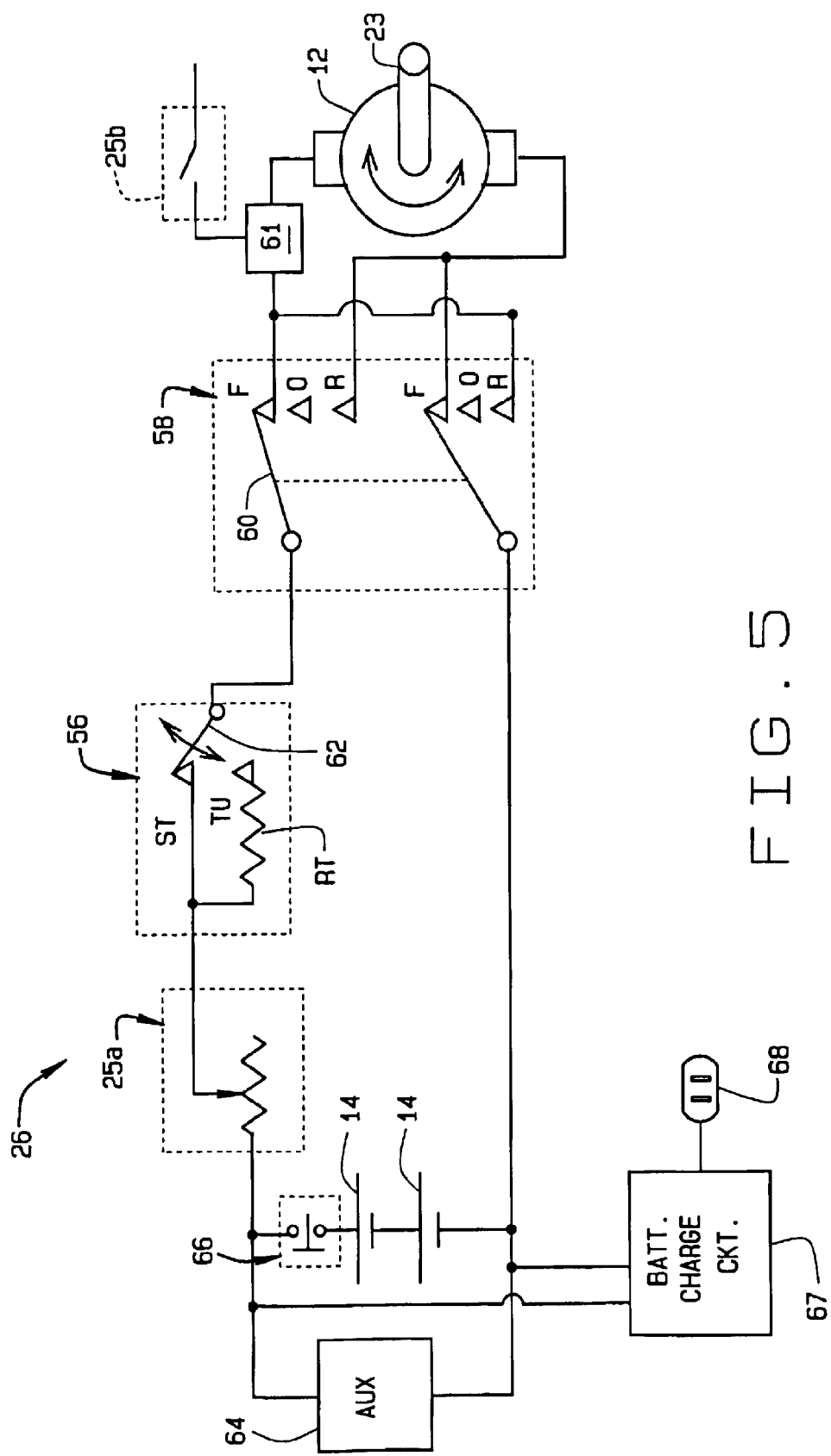
FIG. 5 is a simplified schematic of the electrically system powering the vehicle.

Referring to FIG. 5, the batteries 14 mounted in each carriage 11 are connected in series. The current flow from the batteries to reversible DC motor 12 is through the speed control incorporated in handgrip 25a. The more the handgrip is squeezed, the less resistance is in the circuit path between the batteries and the motor, for the motor to turn at a higher rpm, and for vehicle 10 to go faster. This is accomplished using microswitches incorporated in the handgrip assembly, as is well known in the art.

The circuit path from the handgrip is through a dynamic brake 56 and directional control 58 to the motor. In FIG. 5, the circuit is configured for forward movement of the vehicle. Directional control 58 comprises a three-position switch 60 having a FORWARD position "F", a neutral or OFF position "O", and a REVERSE position "R". The position of the switch is controlled by the operator of the vehicle. When the vehicle is parked, the switch is in its "OFF" position. When the vehicle is to be driven forward, the switch is moved to its FORWARD position and motor 12 is driven in one direction. When the vehicle is to go backward, the switch is moved to the REVERSE position, and the motor is driven in the opposite direction. Alternatively, a static motor brake unit 61 can be incorporated in the drive system. Unit 61 is operable by brake handgrip 25b to reverse the current flow through the motor, when the vehicle is being driven forward, and the brake is applied. Unit 61 is activated when the handgrip is squeezed to reverse current flow through motor 12 and so the motor is driven in reverse. When the handgrip is released, current flow is again through the motor to drive the vehicle forward.

The dynamic brake is used when the vehicle is turned and alleviates the need to exercise the braking system operated by handgrip 25b. The brake includes a switch 62 having two positions. When the vehicle is being driven in a relatively straight line (whether forward or back), switch 62 is in its position ST. However, when the driver turns steering column 23 as he makes a turn, switch 62 is automatically moved from the straight ST position to a turn position TU by the rotation of the steering column. In this position, an additional resistance RT is included in the circuit path between the batteries and motor. This reduces the current flow to the motor and the speed of the motor. When the steering column is turned back to its position where the vehicle is moving straight, switch 62 is automatically moved back to its position ST removing resistance RT from the current path to the motor.

It will be understood by those skilled in the art that although only one motor 12 and its associated batteries 14 are shown in FIG. 5, both motors are operated the same way. Accordingly, the speed of both motors 12 is controlled by handgrip 25a, and both motors are connected to directional control 58 and dynamic brake 56. A resettable fuse 66 is incorporated in each battery/motor circuit. The fuses for both motor control circuits are commonly mounted in the same module.

In addition to controlling operation of both motors, auxiliary circuits 64 can also be operated off of the batteries. These circuits can include running lights, brake lights, flashing emergency lights and spotlights, as well as a back-up alarm which sounds the vehicle is driven in reverse. A battery operated communications system (two-ray radio or cellular communications system) can also be operated off of the battery. A battery charger circuit 67 is connected across the batteries to charge the batteries when the vehicle is parked. A female electrical plug 68 is mounted on the vehicle in a convenient location for connecting the battery charger to an electrical outlet.

To steer vehicle 10, a yoke indicated generally 70 in FIG. 4 extends between the front scooter wheels 18 and attaches to each wheel. Yoke 70 includes a bar 72 extending across the front of platform 40. Brackets 74 are attached at each end of the bar for mounting the respective front wheels 18 to the steering yoke. A steering column 23 from one of the scooters is mounted to bar 72 midway along the length of the bar. As shown in FIG. 2, steering column 23 angles slightly back from the front of the vehicle. This allows the handlebars 24a, 24b, and their associated speed control and braking handgrips 24a, 25b to be conveniently placed with respect to the user of the vehicle sitting in seat 44. A panel 76 is attached to bar 72 and extends vertically across the front of yoke 70. The front of the panel is used for signage, other pertinent information about the vehicle, or appropriately decorated or painted. Modules housing directional control 58, dynamic brake 56, and the resettable fuses 66 are conveniently mounted on bar 72 as shown in FIG. 4.

As shown in FIG. 3, steering column 23 is a two-piece unit having an upper section 23a and a lower section 23b. The upper section is sized so its lower portion fits within the upper portion of section 23b. The two sections are connected together using a pin 78. The pin is removed when the vehicle is to be stored. Although not shown, the pin is connected to one of the column sections so as not to be lost. A brake ring 80 is similarly attached to handgrip 24b. The brake ring is sized to fit over the handlebar and about handgrip 25b when the grip is fully squeezed. When so positioned, the brakes 28 on both rear wheels 20 are locked in place and can released only by removing the brake ring from the handgrip. As also shown in the FIG., seat 44 is detachable from post 42 so to fit between scooter bases 16 in the well of the vehicle. With the seat and upper portion of the steering column detached, vehicle 10 is readily stored. The overall dimensions of the vehicle, when disassembled, is 30"*38"*19"(76 cm.*96 cm.*48 cm.). Thus, the vehicle readily fits in a storage container on a recreational vehicle or mobile home, a storage locker in a factory or warehouse, or a storage compound or building at an outdoor worksite. In addition, because of the accessibility of electrical plug 68, battery charger 67 is readily connected to an external electrical circuit to recharge the batteries.

Referring now to FIGS. 6-8, other embodiments of the mobility vehicle are shown. In FIG. 6, a vehicle 110 is shown to have a storage compartment 112 fitted onto platform 40. The storage width of the storage compartment corresponds to the width of platform 40 between the scooter bases 16, the length of the compartment corresponds to the length of seat 44, and the height of the compartment corresponds to the height of the post 46 on which seat 44 is mounted. A hinged seat 114 forms the top of the compartment. To access the compartment, the seat is lifted off to one side. Hand tools, small electrical tools, groceries, etc. are readily stowed in the compartment. The compartment can be enclosed on all sides, or can have an open, basketlike construction.

In FIG. 7, a mobility vehicle 120 includes a front and rear mount 122, 124. The mounts include brackets 126 for carrying a ladder L, buckets, tools, or other equipment or supplies about a factory, warehouse, or job site. The mounts are removably attached to platform 40 so as not to be in the way when not needed.

Finally, in FIG. 8, mobility vehicle 10 is shown to include running lights for navigating the vehicle at night. A front or headlight 82 is attached to steering column 23 and rotates with the steering column as it is turned so the driver always can see in the forward direction in which the vehicle is moving. Rear or taillights 84 are mounted at the backend of the respective scooter bases 16. As previously noted, the taillights act as brake lights when the vehicle is stooping. They can also act as turn signals. Although not shown, a horn can also be mounted on the vehicle to alert pedestrians of the approach of the vehicle, and warn as to when the vehicle is driven in reverse.

Other modifications to the vehicle include, for example, a hitch 86 shown in FIG. 8 to be attached to the rear of the platform for attaching a trailer to be towed by the vehicle.

The trailer would hold groceries or tools. As shown in FIG. 9, a cover or roof 90 can be attached to the vehicle and extend over the platform to protect the occupant from the elements in inclement weather. The cover is preferably a detachable cover made of a lightweight plastic material, although it can be permanently installed.

In view of the above, it will be seen that the several objects and advantages of the present invention have been achieved and other advantageous results have been obtained.

Having thus described the invention, what is claimed and desired to be secured by Letters Patent is:

1. A mobility vehicle for carrying a person from one place to another comprising:
    a pair of powered scooters each of which includes a DC motor and at least one battery powering the motor, a scooter base on which a person operating the scooter stands, the base having wheels mounted thereto at each end thereof with one of the wheels being drivingly connected to the motor for driving the scooters, a steering column extending upwardly from the base at one end of the base, the steering column being connected to the wheel not driven by the motor, and handlebars used to control the speed of the scooter, the handlebars attached to the steering column at the upper end of the steering column;
    a platform to which the scooter bases are attached, the scooter bases extending along opposite sides of the platform;
    a drive system for driving the vehicle and including one of the DC motors and one of the batteries from one of the scooters, the motor being drivingly connected to one of the scooter wheels to drive the vehicle; and,
    a yoke extending between the scooter wheels at a front end of the scooter, the steering column from one of scooters being attached to the yoke for steering for the vehicle as the column is turned with the handlebars on the steering column being used to turn the steering column and steer the vehicle, control the speed of the vehicle, and brake the vehicle.

2. The mobility vehicle of claim 1 further including a seat mounted on the platform for the operator of the vehicle to sit down while driving the vehicle.

3. The mobility vehicle of claim 2 wherein the platform includes a post extending upwardly from a base of the platform, the seat being removably attached to the seat so the seat can be removed when the vehicle is stored.

4. The mobility vehicle of claim 2 in which the steering column is removably attached to the yoke so to be disconnected from the yoke when the vehicle is stored.

5. The mobility vehicle of claim 2 in which the steering column is pivotally mounted to the yoke and movable from an upright position when the vehicle is used to a lowered position when the vehicle is stored.

6. The mobility vehicle of claim 1 in which each scooter base includes a plurality of batteries for powering its associated DC motor, and the bases and the platform define a housing for the DC motor and the batteries.

7. The mobility vehicle of claim 6 further including a recharging circuit connected to the batteries for recharging the batteries from an external power source, and an electrical connector mounted on the platform for connecting the external power source to the recharging circuit.

8. The mobility vehicle of claim 1 wherein the drive system includes a belt attached between an output shaft of a motor and a scooter wheel located at the rear of the vehicle for driving the vehicle.

9. The mobility vehicle of claim 1 further including a dynamic brake for slowing the speed of the vehicle when the vehicle is turning.

10. The mobility vehicle of claim 9 further including a static motor brake unit for reversing current flow through the motor when the vehicle is braked.

11. The mobility vehicle of claim 10 further including an auxiliary electrical circuit for powering auxiliary electrical equipment installed on the vehicle.

12. The mobility vehicle of claim 1 wherein one of the handlebars includes a handgrip for applying a brake to the wheels, and further including a brake ring fitting over the handlebar and about the handgrip, when the handgrip is fully squeezed to lock the brakes in place and prevent the vehicle from moving.

* * * * *